April 20, 1965 A. F. APKING ETAL 3,179,828
AMORTISSEUR WINDING FOR DYNAMOELECTRIC MACHINES
Filed April 6, 1961

Inventors
Arthur F. Apking
Franklin H. Grooms
by Robert C. Benson
Attorney

United States Patent Office 3,179,828
Patented Apr. 20, 1965

3,179,828
AMORTISSEUR WINDING FOR DYNAMO-
ELECTRIC MACHINES
Arthur F. Apking, Morrow, and Franklin H. Grooms, Cincinnati, Ohio, assignors to Allis-Chalmers Manufacturing Company, Milwaukee, Wis.
Filed Apr. 6, 1961, Ser. No. 101,178
3 Claims. (Cl. 310—183)

This invention relates generally to amortisseur or damper winding for a dynamoelectric machine. More specifically this invention relates to damper windings on a synchronous speed, dynamoelectric machine of the round rotor or distributed field type.

In the past the rotors of synchronous speed motors were made up of a series of laminations having winding slots near their periphery. A distributed winding was positioned in the slots in such a manner to form arcuately spaced magnetic poles. These magnetic poles were spaced apart to lock in with the rotating magnetic field that was impressed upon the stator of the dynamoelectric machine. An auxiliary winding or damper winding was positioned in some of the remaining slots of the rotor and short circuited at the ends of the rotor. This winding is known as an amortisseur winding or damper winding and is used to start the motor on an induction motor principle and stabilize it when it is operating at synchronous speed. When the motor is operating at synchronous speed it has a tendency to hunt which means that the speed of the rotor varies from the speed of the rotating field. When the rotor deviates from the synchronous speed a current is induced in the auxiliary or damper winding which tends to increase the speed of the rotor if it is going slower than synchronous speed and decrease the speed of the rotor if it is exceeding the synchronous speed.

Hunting is also common in generators due to pulsating loads or oscillations of the prime mover. Hunting is especially undesirable in generators connected in parallel because it creates a problem of load sharing. Properly located damper windings reduce hunting in generators to a minimum. Furthermore, unbalanced or single phase loads applied to a generator establish an inverse rotating magnetic field in the armature. This field induces double frequency eddy currents in the rotor thereby reducing the efficiency of the machine and producing additional heating of the rotor. A low reactance, low resistance damper winding such as proposed by this invention suppresses the double frequency eddy current.

Because of the bulk and position of the end turns of the distributed winding on a dynamoelectric machine plus the large forces exerted on the windings during operation, it has always been a problem to insulate electrically the damper windings from the distributed field windings and to mechanically and electrically interconnect the damper windings. This interconnection of the damper windings was very frequently accomplished by means of clamps and braces that were mounted on the core of the rotor.

Applicants' proposed dynamoelectric machine incorporates a simple means for forming the damper winding on a round rotor or distributed field synchronous speed dynamoelectric machine by positioning rotor bars in the vacant slots of the rotor and having them extend beyond the ends of the core. A layer of electric insulating material is wound around the end turns of the distributed field winding and a banding wire is wound on top of the insulation. The insulating material can be in addition to or in place of the steel banding wire used in the past. One material that is especially good for this use is a glass tape impregnated with a thermal setting resin. This tape forms a solid ring on curing and acts as both a banding material and an insulation. The extensions of the rotor bars are positioned over this layer of banding material and are in turn banded together and short circuited by an electrically conducting material such as copper wire. This provides a very good damper winding which is cheaper, simpler and easier to assemble than the damper windings of the known prior art.

Therefore it is the object of this invention to provide a new and improved rotor for a dynamoelectric machine.

Another object of this invention is to provide a new and improved damper winding for a rotor of a synchronous speed dynamoelectric machine.

Another object of this invention is to provide a new and improved damper winding for a synchronous speed dynamoelectric machine of the round rotor or distributed field type.

Other objects and advantages of this invention will be apparent from the following description when taken in connection with the accompanying drawing, in which.

Figure 1:
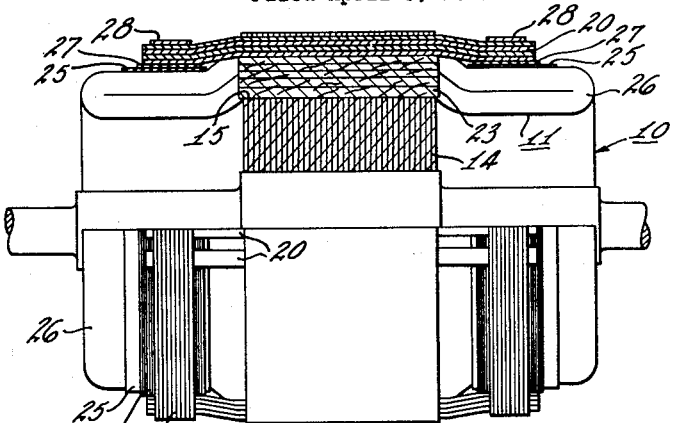
FIG. 1 is a plane view partially in section of a rotor of a dynamoelectric machine of this invention.
Figure 2:
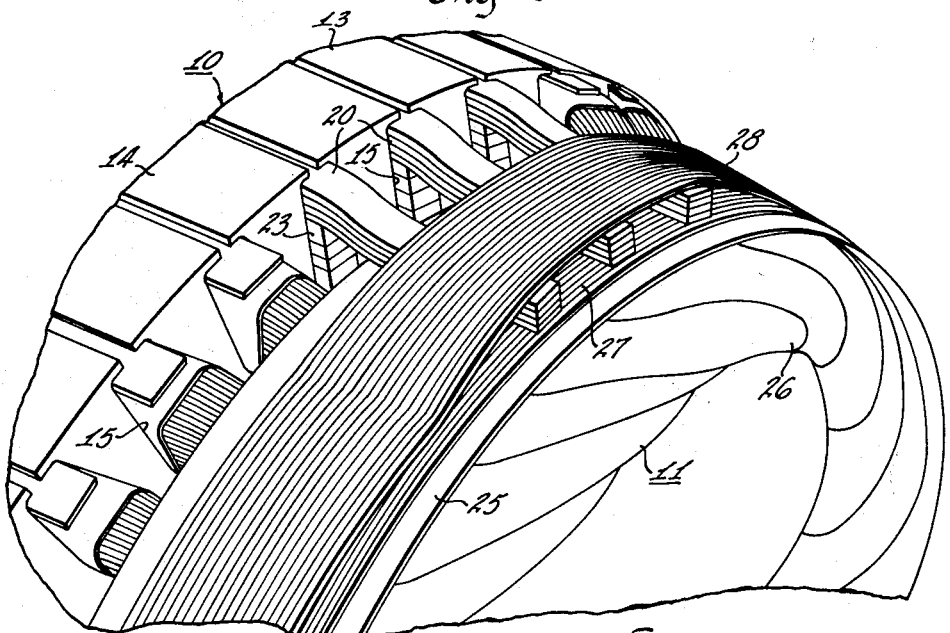
FIG. 2 is a pictorial view of a portion of the rotor of FIG. 1.
Figure 3:
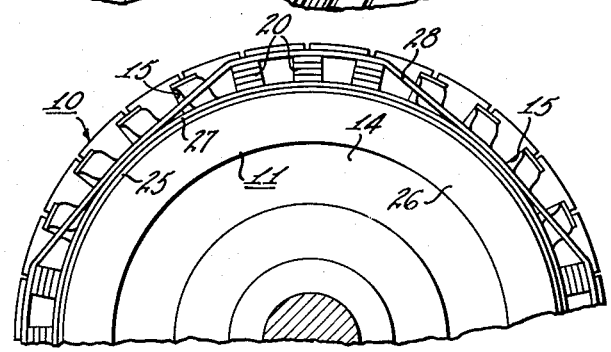
FIG. 3 is an end view of the rotor shown in FIG. 2.

Referring more specifically to the drawings by characters of reference, the invention is illustrated by a rotor 10 of the round rotor type having a distributed winding 11 to form the magnetic poles 13 on the rotor 10. The rotor is made up of a series of iron laminations 14 in a manner well known in the art and has a plurality of winding slots 15 equally spaced along its outer periphery. Some of the slots 15 are filled with coils of the distributed excitation winding which are energized by an external source (not shown) in a manner well known in the art of synchronous motors. This winding 11 is formed in such a manner as to form an even number of arcuately spaced magnetic poles 13 which are designed to lock in with the rotating field impressed on the stator of the dynamoelectric machine.

Dampers bars 20 are positioned in some of the slots 15 not filled with the excitation winding 11 and are electrically connected to each other. The damper bars can be made of any electrically conducting material such as copper or aluminum. A number of these bars 20, or a single bar if preferred, is positioned in each slot 15 and extends beyond the ends of the rotor core. The remainder of the slot may be filled with any suitable slot filler 23 to improve the mechanical strength of the rotor.

A layer of insulation 25 is wound around the end turn 26 of the distributed winding 11. A suitable banding material such as steel wire 27 is applied over this insulation to retain the end turns in position during operation of the machine. In an alternate arrangement the wire and insulation can be replaced by a glass tape impregnated with a thermal setting resin which is commonly used in banding the rotors and stators of dynamoelectric machines. This tape when cured becomes a solid ring and serves the dual function of retaining the end turns in position and insulating them electrically from the damper bars 20. If this type of tape is used, the steel banding wire is not required. These resin impregnated tapes are commercially available under the trademarks of "Vec-o-Tex," "Res-i-Glas" and "Varbond."

The extensions of the damper bars 20 are positioned on top of the layer 27 of steel wire. The bars are in turn interconnected and short circuited by a suitable electrical conductor such as banding wire 28 made up of copper. However, other suitable banding wire or material would be adequate for both electrically interconnecting the damper bars and retaining the bars in their position against the centrifugal and magnetic force induced in the windings during operation of the rotor.

The damper bars 20 can be made of any suitable electrically conducting material but are preferably made of copper strips. The bars may be partially formed prior to assembly. The strips are preferably relatively thin for ease in handling. The banding material around the end turns of the distributed winding 11 and around the damper bars may be applied with winding machines in a manner well known in the electrical industry. Therefore, it can be seen that applicants' proposed damper winding is extremely simple, inexpensive and easy to assemble.

In assembly the rotor core is formed from a plurality of stacked iron laminations. Then the distributed excitation winding is positioned in selected slots in the core to form the arcuately spaced magnetic poles in the rotor. The end turns of the distributed winding are then banded together and covered with an electric insulating material. As pointed out above, this may be done by banding the end turns with a single material such as resin impregnated glass tape. The individual damping bars are then inserted in some of the remaining slots. If the slots are not filled by the damping bars, the remainder of the slot is filled with a suitable filler. The ends of the damper bar extend over the end turns of the distributed winding and are separated therefrom by the electric insulating material. The ends of the damper bars are then electrically interconnected and mechanically held together by banding them with a suitable electric conductor.

Although but one embodiment of this invention has been illustrated and described, it will be apparent to those skilled in the art that various modifications and changes may be made therein without departing from the spirit of the invention or the scope of the appended claims.

Having now particularly described and ascertained the nature of our said invention and the manner in which it is to be performed, we declare that what we claim is:

1. A rotor for an alternating current dynamoelectric machine comprising a core having a plurality of arcuately spaced slots near its periphery, coils positioned in some of said slots and extending beyond said core to form a winding for said rotor and damper bars positioned in some of said slots not containing said coils, said damper bars extending beyond the ends of said core and over said extended portions of said coils, thermal setting tape wound around the extended portions of said coils between said extended portions of said coils and said bars to retain said coils in position and insulate them from said damper bars, the extended portions of said bars being interconnected electrically by strands of banding wire wound around the outer periphery of said bars.

2. A rotor for an alternating current dynamoelectric machine comprising a core having a plurality of arcuately spaced slots near its periphery, coils positioned in some of said slots to form an excitation winding for said rotor and form arcuately spaced magnetic poles on said rotor and damper bars positioned in some of said slots not containing said coils, said damper bars extending beyond the ends of said core, a layer of insulation positioned between said extended portions of said bars and said extended portions of said coils to electrically insulate said bars from said excitation windings and strands of banding wire wound around the extended portion of said bars to interconnect them electrically.

3. A rotor for an alternating current dynamoelectric machine comprising a core having a plurality of arcuately spaced slots near its periphery, coils positioned in some of said slots and extending beyond the ends of said core to form an excitation winding for said rotor and damper bars positioned in some of said slots not containing said coils, said damper bars extending beyond the ends of said core, thermal setting resin impregnated glass tape wound around the extended portions of said coils between the extended portions of said coils and the extended portions of said bars to retain said coils in position and insulate them electrically from said damper bars, and strands of banding wire wound around the outer periphery of said extended portions of said bars to interconnected said bars electrically.

References Cited by the Examiner

UNITED STATES PATENTS

| 1,208,183 | 12/16 | Mattman | 310—183 |
| 1,508,251 | 9/24 | Reist et al. | 310—183 |
| 2,768,317 | 10/56 | Porter | 310—265 |
| 2,815,461 | 12/57 | Jernberg | 310—183 |

FOREIGN PATENTS

| 850,487 | 7/49 | Germany. |

MILTON O. HIRSHFIELD, *Primary Examiner.*

DAVID X. SLINEY, *Examiner.*